April 26, 1966 W. F. GROTE ETAL 3,248,481

TELEPHONE ANSWERING DEVICE

Filed June 6, 1962 3 Sheets-Sheet 1

INVENTORS
WALTER F. GROTE
EDWARD J. KIMMEL
BY
Miller Henninger
ATTORNEY

April 26, 1966 W. F. GROTE ETAL 3,248,481

TELEPHONE ANSWERING DEVICE

Filed June 6, 1962 3 Sheets-Sheet 2

RINGING ACTUATOR

VOICE ACTUATOR

INVENTORS
WALTER F. GROTE
EDWARD J. KIMMEL

BY

Miles Henninger

ATTORNEY

April 26, 1966 W. F. GROTE ETAL 3,248,481

TELEPHONE ANSWERING DEVICE

Filed June 6, 1962 3 Sheets-Sheet 3

INVENTORS
WALTER F. GROTE
EDWARD J. KIMMEL
BY
Miles Henninger
ATTORNEY

United States Patent Office 3,248,481
Patented Apr. 26, 1966

3,248,481

TELEPHONE ANSWERING DEVICE

Walter F. Grote, R.R. 5, Hanover, Ind., and Edward J. Kimmel, 2061 Eastern Parkway, Louisville, Ky.
Filed June 6, 1962, Ser. No. 200,536
12 Claims. (Cl. 179—1)

This invention relates to improvements in telephone answering devices and particularly to a device in which a person may answer a telephone from a location remote from the telephone or without touching the telephone.

Generally the present construction includes a first induction coil on which the telephone is placed so that the energy generated in the inductive coil upon ringing of the telephone, activates an amplifier. The amplifier, in part controls movement of a step relay for causing operation of a motor in a device for lifting the telephone the handpiece and thereby completing the circuit within the telephone base itself. A voice-actuated amplifier also acts on the step relay and determines whether or not the telephone is to be actually kept in condition for conversation. A receiver-transmitter receives and converts the sounds made by the persons calling and the electrical energy derived from such sounds is fed to a second induction coil adjacent the handpiece receiver and actuates the coil therein. The second induction coil acts on the conversation amplifier-speaker and translates the incoming electrical impulses into sounds for broadcast to the person answering the telephone. We have found that two or three stages of amplification are sufficient for the ringing and voice actuated amplifiers but that the conversation amplifiers should have more stages of amplification and a power output stage for increased output from a low input signal level.

The sequence of operations of this system is generally as follows: When the telephone rings once, a current is induced in the first induction coil to activate the ringing-actuated amplifier which causes movement of the step relay through the first step and energizes a first visible signal shown as a green light indicator. Assuming that a person is present within sound of the telephone bell and wishes to answer the call, when the telephone rings a second time, such person speaks a first audible signal shown as any desired words sufficiently loudly to be picked up by the voice-actuated amplifier and to actuate the step relay for movement to a second step whereby the second visible signal shown as a red light is energized. At this point the telephone rings again, the step relay moves through the third step and the green light is again energized. On the next ring, a second vocal signal is given so that the relay moves through the fourth step and the red light is again energized. The fourth relay step also closes to the motor of the handpiece lifter and the motor raises the handpiece to close the normal circuit in the telephone. A switch is now actuated by the lifter and to connect the conversation receiver-amplifier which permits conversation at a distance dependent on the sensitivity of the microphone and broadcast volume of the conversation amplified. The above arrangement requires 20–35 seconds for warming the tubes of the receiver-amplifier, during which time there is no audible output. If such time is undesirable, the receiver-amplifier may be continuously operated as the power required is relatively small, and there would then be immediate operation of the receiver-amplifier. If no one hears the bell and speaks a vocal signal, the relay is not moved up to the second step but is reset to its original position. Operation of the voice-actuated amplifier is maintained for a full pre-set time but a conversation may be continued beyond such time. After a given time, a timer re-energizes the lifter motor and lowers the telephone handpiece to open the usual telephone switch.

It is also possible to use the voice actuator as a conversation amplifier and to omit the switching in of such amplifiers. However, then the voice amplifier must be made of a size to develop sufficient sound and to have a sensitivity for receiving sound at a sufficient level and at a desired distance. When the voice actuator is de-energized, a relay actuated thereby is also de-energized and a contact is closed and current is applied to a timer motor which operates until the motor comes to a stop. When the relay is energized, a spring on the timer motor sets a clutch for operation at a pre-set time. After the pre-set time, the clutch engages and the timer motor can again operate to the stop position when the voice actuator relay is energized. A manual switch is provided which is capable of over-riding automatic operation of the timer so that the telephone may be used longer than the timer would ordinarily permit, or to permit complete manual operation of the telephone.

Figure 1:
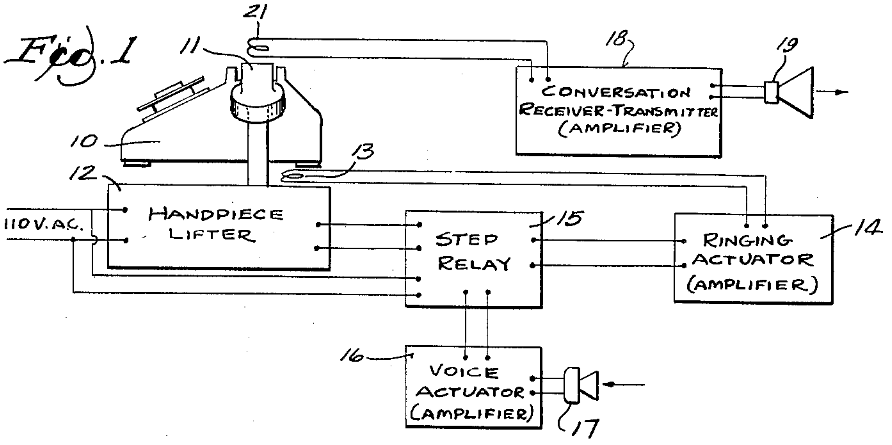
FIG. 1 is a block diagram indicating the various sub-assemblies of the equipment and the interconnections thereof.

Referring particularly to the drawings, 10 designates the usual telephone instrument with the usual handpiece 11, the telephone instrument and handpiece being intended to be placed on a handpiece lifting device 12, on/or in which a first induction coil 13 is mounted. Coil 13 is connected with sub-assembly 14 receiving and amplifying the current induced therein from the coil for ringing the telephone bell, the ringing actuator-amplifier being connected with a step relay 15 and in part controlling operation thereof. The step relay is also controlled in part by a voice actuator-amplifier 16 having a microphone 17 for pick-up of voice signals from a person responding to the telephone ring. The step relay 15 controls operation of the handpiece lifter and of various other sub-assemblies to be described. A voice receiver-transmitter 18 has a power operated speaker 19 for pick-up of replies in the telephone conversation and broadcasts the sounds produced by currents received by way of the telephone. The conversation receiver-transmitter 18 receives electrical energy from an induction coil 21 which is placed on the handpiece 11. Obviously, the several amplifiers 14, 16 and 18 will have the number of stages required for the desired degree of amplification and sensitivity.

Figure 2:
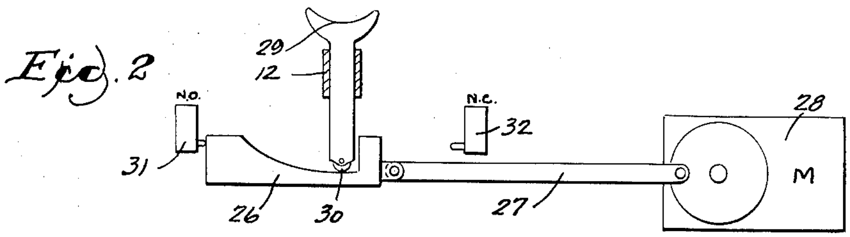
FIGS. 2 and 3 are each diagrams of one form of telephone handpiece lifter and respectively show the lifting element in lowered and in raised position.
Figure 3:
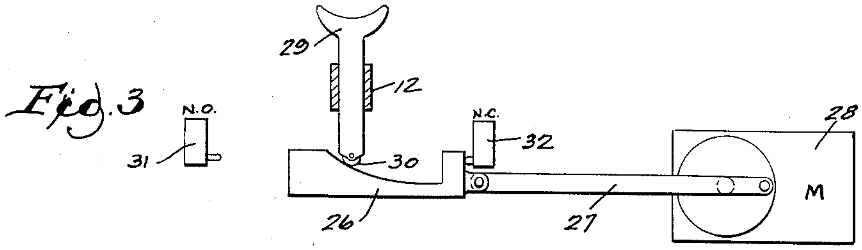
Figure 4:
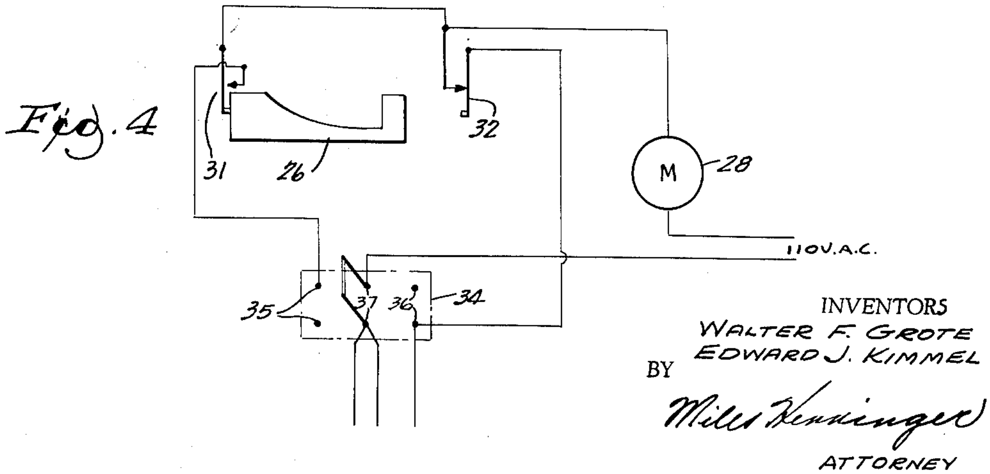
FIG. 4 is a diagram illustrating the connections of the handpiece lifter motor with the various switches controlling the same.

A satisfactory handpiece lifter 12 includes the structure indicated in FIGS. 2 and 3 as comprising a member 26 reciprocally movable and having an inclined or wedge surface. The wedge 26 is connected by way of a rod and crank structure 27 driven by a motor 28 which operates at a speed of only 7 r.p.m. Vertically movable lifters 29 are placed for engaging endwise with the telephone handpiece 11 adjacent the two ends thereof as the lifters are raised. The lifters 29 are guided in the lifter unit 12 and bear on the wedge 26 by way of a ball foot 30 or the like. Reciprocation of the wedge 26 alternately operates microswitches 31, 32 at the end of the lifter lowering stroke and the end of the lifter raising stroke respectively of the wedge. The microswitches 31 and 32 are both normally closed except in the rest position (see FIGS. 2 and 4) when switch 31 is always open. When wedge 26 has moved away from switch 31, its contacts close so that a circuit may be open or closed, through the wedge operating motor 28 dependent on the connections made by a double pole double throw switch 34 in such circuit. The double pole double throw switch 34 has pairs of contacts 35 and 36 respectively working with microswitches 31 and 32 to control the circuit of the motor 28 for upward and downward movement of the lifter 29, and common contacts 37 for engagement of contacts 35 or 36. The switch 34 is operable manually and closure of the contacts 35 or 36 produces a circuit through the switches 31 or 32 when such switches would normally interrupt the circuit of the motor 28. Thus the telephone may be used for making calls as usual and a call may be continued even though the system would otherwise be interrupted.

A finger can obviously be used in place of lifters 29, for the so-called "Princess" type telephone and a solenoid can be used in place of motor 28. A solenoid will be particularly adaptable to lifting the handpiece of a wall-mounted telephone.

Figure 5:
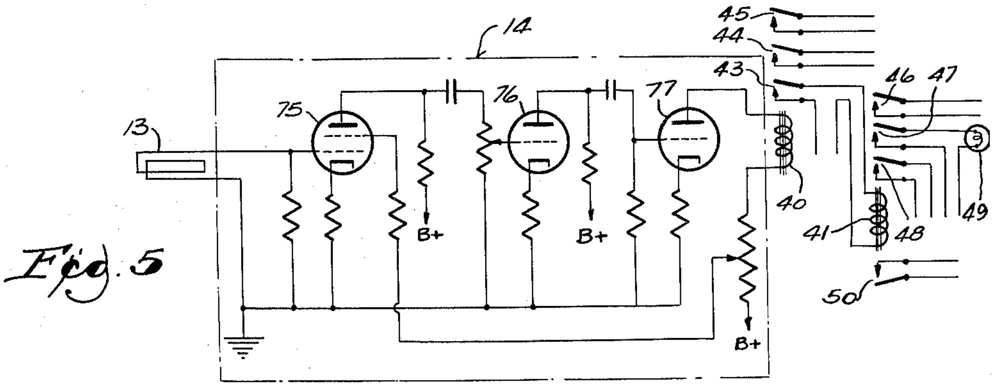
FIG. 5 is a line diagram showing the interconnection of the ringing actuator-amplifier with a number of multiple switches and a portion of the circuit controlled thereby.
Figure 8:
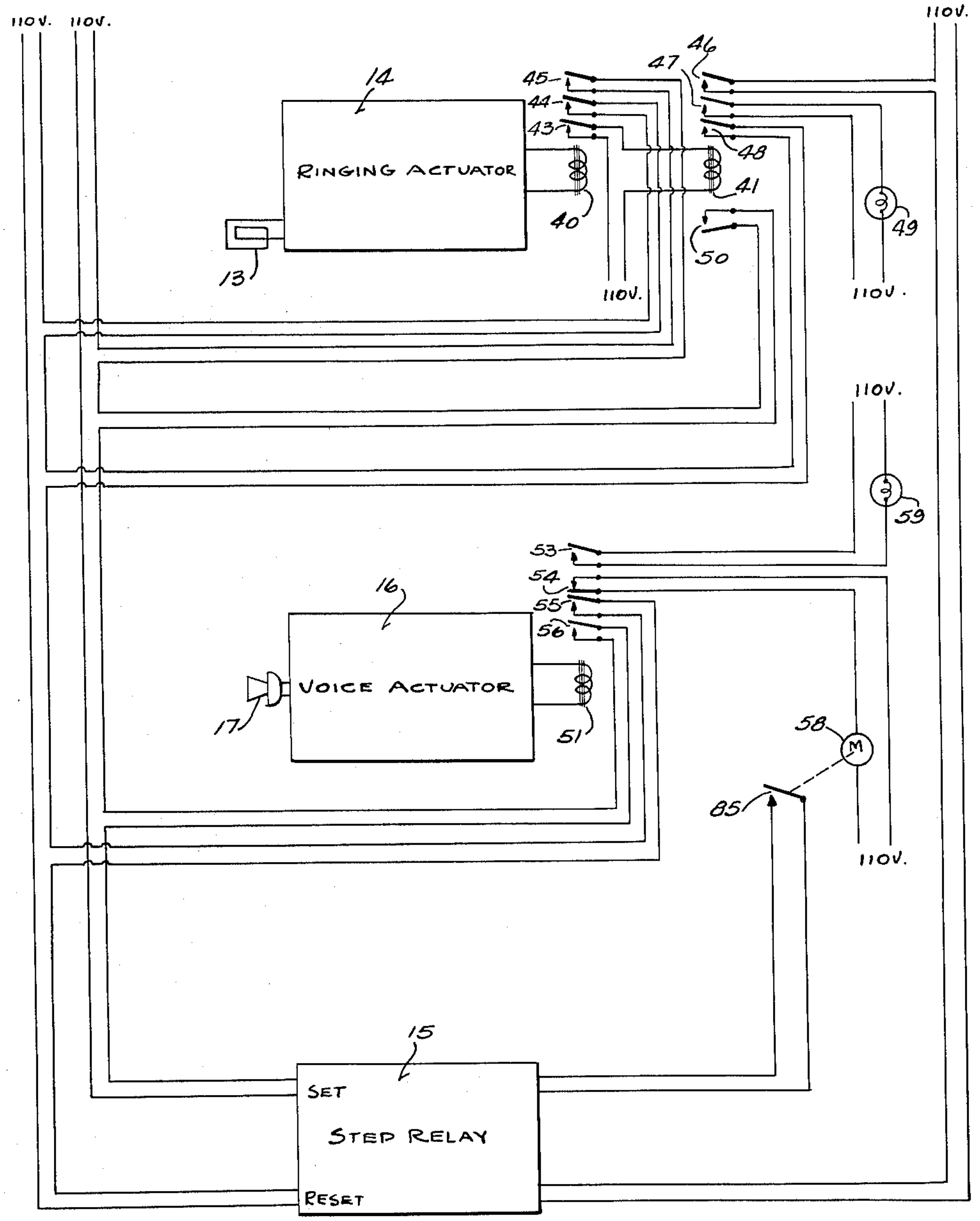
FIG. 8 is a diagram showing the interconnections of FIGS. 5, 6 and 7 and of some electrical parts controlled thereby.

The ringing actuator 13, 14 is a three-stage amplifier as indicated in FIG. 5, in which the first induction coil 13 is the input member and the output member is a relay 40 which controls a relay 41, the relays severally having contacts 43–45 and 46–48. The amplifier itself is entirely conventional and we have in fact used a commercially available unit (manufactured and sold by The Heath Company) and identify only the tubes of such amplifiers. Obviously, transistors may be used in place of tubes in all of the amplifiers disclosed therein. The relay 40 is energized whenever first coil 13 has a current induced therein upon ringing of the telephone bell, and actuates relay 41 which closes the circuit to one coil of the step relay or rotary switch 15 (Potter & Brumfield, AP17A). Relay 41 also energizes a first visible signal shown as a green light indicator 49. Relay 40 acts on contacts 43, 44 and 45 while relay 41 has contacts 46–48 and 50 for completing circuits as shown in FIG. 8.

Figure 6:
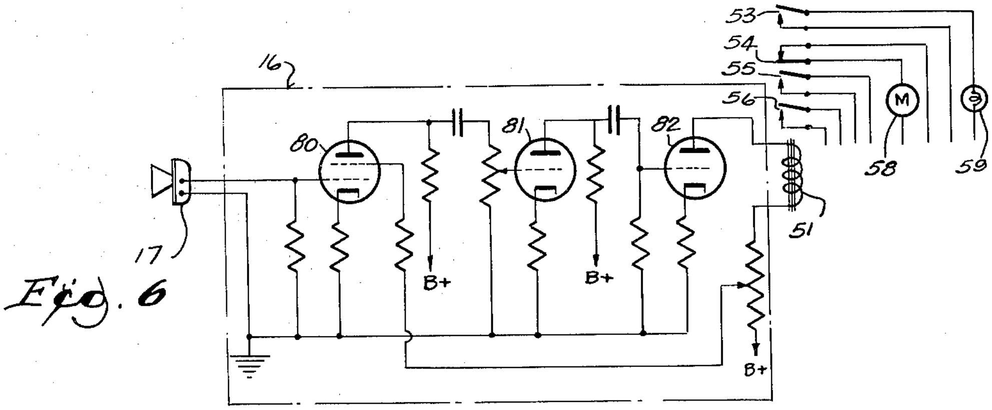
FIG. 6 is a line diagram showing the voice actuator-amplifier and several switches for connection of such actuator with other portions of the system.

The voice actuator 16 is an amplifier as shown in FIG. 6 and its input member is the microphone 17. The output of the voice actuator is a relay 51 for actuating four sets of contacts 53–56 respectively of which contacts 53 control energization of a second visible signal shown as a red light indicator 57 and contacts 54 control energization of a timer motor 58 which automatically returns the handpiece lifter 29 to the down position and seats the handpiece on the telephone instrument after a pre-set time (unless the circuit to the motor 28 is under the control of the over-ride switch 34 and is kept open so that the conversation can be continued beyond the pre-set time). Contacts 54 are closed when relay 51 is de-energized and complete a circuit to drive the timer 58 to a dead-stop position. Whenever relay 51 is energized, contacts 54 open and a spring (not shown) drives the timer 58 to cock a clutch mechanism for action at a preset time interval. As soon as relay 51 is again de-energized, contacts 54 reclose and timer motor 58 is again driven to its dead-stop position. Timer 58 (Haydon DA 1100s) runs at 1 r.p.m. in up to 57 seconds and re-sets relay 15 to lower the headpiece lifter if there is no voice acting on sub-assembly 16 within the time delay period.

Figure 7:
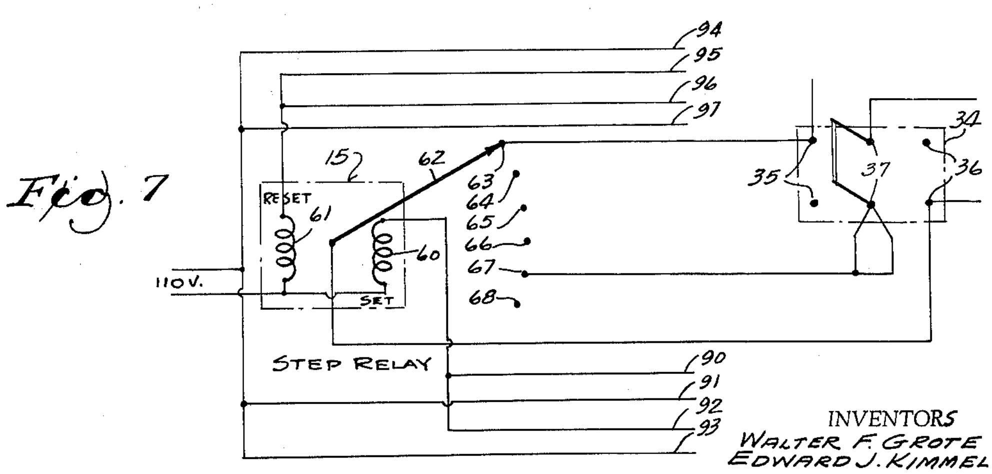
FIG. 7 is a diagram of connections for the step relay controlling the handpiece lifter motor and which is controlled by the ringing and voice actuator-amplifier.

The step relay 15 is also a commercially available structure (Universal Relay Corp., MER 115A) and (see FIG. 7) includes a "set" coil 60 and a "re-set" coil 61 for operating an arm 62 moving in steps over an arcuate arrangement of contacts severally indicated at 63–68.

The conversation receiver and transmitter 18–19 is a commercial unit (manufactured by The Heath Company) and the input coil 21 (second induction coil) is a known type of telephone pickup coil with another coil for cancelling hum in the pick-up coil.

Connections from the step relay 15 (other than those mentioned on page 7) are numbered and related to the system as indicated below:

| Connection: | To part— |
|---|---|
| 90, 91 | Ringing amplifier 14. |
| 92, 93 | Ringing amplifier 14 and |
| 94, 95 | Voice actuator 16. |
| 96, 97 | Timer 58. |

The amplifier 14 includes tubes 75, 76 and 77 which successively raise the level of signal received from first coil 13 while the amplifier 16 includes tubes 80, 81 and 82 to amplify the level of sound received by the microphone 17. The connections and electronic parts employed in amplifier 14 and 16 are well known and are not further described.

The present device commences to operate when the telephone bell rings and the ringing coil therein induces current in the coil 13. Such current is applied to the grid of tube 75 and the grids of tubes 76 and 77 are energized to energize relay windings 40 which closes contacts 43 to energize relay winding 41 by which contacts 47 are closed to energize visible signal 49. Current also flows through "set" winding 60 of step relay 15 to advance the arm 62 thereof to the second position 64. On the second ringing of the telephone bell, winding 41 is again energized and contacts 47 are opened to de-energize green light 49, and contacts 44 are closed.

As soon as the green light 49 is off, a voice signal to the microphone 17 may act through amplifier 16 to cause energization of winding 51. Another circuit is now completed to relay 15 and its arm 62 advances to the third position 65. Winding 46 is energized and closes contacts 53 to visible signal 57. When the telephone rings again, winding 40 and 41 are re-energized as described above and contacts 47 are closed to re-energize green light 49. "Set" winding 60 is again energized and relay arm 62 moves to the fourth position 66. Another audible response to the ringing energizes winding 41 to close contacts 47 and reconnect green light 49. Step relay 15 is again actuated and arm 62 moves to its fifth position 67. Contacts 47 re-open and green light 49 is extinguished while winding 51 is energized to close contacts 53 and energize red light 59. A circuit is now established through switch 34 to timer motor 28 which again raises lifter 29 and handpiece 11 to complete the telephone circuit for conversation.

Pick-up of a voice signal by the microphone 17 causes reenergizing of winding 51 to close contacts 54 and operate timer 58. The timer periodically opens the circuit controlled thereby and is spring loaded to advance after a pre-set time interval at the next closing of the timer circuit, which takes place when conversation has ceased. Hence, after a pre-set time interval, switch 85 (see FIG. 8) is closed, "re-set" coil 61 of relay 15 is energized and arm 62 is returned to position 63 to complete a circuit through contact 35 of manual switch 34 to motor 28 which lowers the lifter 29. Handpiece 11 is thus returned to the cradle of phone instrument 10 and the system is ready for a second call.

It will be noted that ringing actuator relay windings 40, 41 and voice actuator relay winding 51 must be energized in particular sequence to close circuits to the set coil 60 of relay 15 and the re-set coil 61 thereof. Thus contacts 45, 50 (relays 40 and 41) and contact 56 (relay 51) (or contacts 46 of relay 41) must be closed to complete a circuit to step relay set coil 60. Step relay re-set coil 61 is energized by contacts 44 and 48 (relays 40 and 41 or contacts 46 of relay 41) and contact 55 (relay 51), if a series of telephone rings is unanswered by voice. Re-set coil 61 is energized by closing of switch 85 upon operation of timer motor 58 when such motor acts to cause lowering of the handpiece to open the circuit in the telephone instrument.

Obviously, sound may also be used for directly closing the circuit in the telephone instrument if change in such instrument is possible. Also a photo cell and light beam can be used to control the lifter motor or directly for closing the circuit in the telephone instrument without lifting the handpiece. The light beam is preferably interrupted as by a shutter when the telephone circuit is completed and the shutter may be actuated by the motor 28. An "intercom" type of telephone system may be used to produce high and low pitch sounds (as substitutes for the red and green lights) if the user does not have visual contact with the master telephone of such system.

We claim:

1. In a device for answering a hand-set telephone without contact therewith by the person answering, a first coil for induction of current therein upon flow of signal current for ringing of the telephone, a first amplifier energized responsive to the current induced in the first coil, a first visible signal remote from the telephone and in circuit for actuation when the telephone receives a call, a first relay energized through the first amplifier for controlling the first visible signal remote from the telephone, means for receiving an audible signal made remotely from the telephone and in circuit for actuation when the telephone receives a call, a second amplifier actuated responsive to said another signal originating remotely from the telephone, second relay energized through the first amplifier, a second visible signal also energized upon actuation of the second amplifier, a step relay having plural contacts engaging individually in sequence beginning with a first contact upon energization thereof under the joint control of the said first and said second relays, and means for closing the circuit of the telephone receiver and transmitter upon movement to a given position of the step relay.

2. In a device for answering a hand-set telephone without contact therewith by the person answering, a first coil for induction of current therein upon flow of a signal current for ringing of the telephone, a first amplifier energized responsive to the current induced in the first coil, a first visible signal remote from the telephone and in circuit for actuation when the telephone receives a call, a first relay energized through the said first amplifier for controlling the visible signal, a second relay energized upon action of the first relay, means for receiving an audible signal made by the person answering remote from the telephone and in circuit for actuation when the telephone receives a call, a second amplifier actuated responsive to said audible signal, a third relay energized through said second amplifier, a step relay having plural contacts engaging individually in sequence beginning with a first contact upon energization thereof under the joint control of the first, second and third relays, and means for closing a circuit in the telephone receiver and transmitter upon movement to a given position of the step relay.

3. In a device for answering a hand-set telephone without contact therewith by the person answering, a first coil for induction of current therein upon flow of a signal current for ringing of the telephone, a first amplifier energized responsive to the current induced in the first coil, a first visible signal remote from the telephone and in circuit for actuation when the telephone receives a call, a first relay energized through the said first amplifier for controlling the visible signal, a second relay energized upon action of the first relay, means for receiving an audible signal made remotely from the telephone and in circuit for actuation when the telephone receives a call, a second amplifier actuated responsive to said audible signal receiving means, a third relay actuated through said second amplifier, a second visible signal actuated under control of the second and third relays, a step relay having plural contacts engaged individually beginning with a first contact and in sequence upon energization under the joint control of the first, second and third relays, and a lifter for raising the telephone hand-set upon movement to a given position of the step relay to complete a circuit in the telephone receiver and transmitter.

4. In a device for answering a hand-set telephone without contact therewith by the person answering, a first coil for induction of current therein upon flow of a signal current for ringing of the telephone, a first amplifier energized responsive to the current induced in the first coil, a first visible signal remote from the telephone and in circuit for actuation when the telephone receives a call, a first relay energized through the said first amplifier for controlling the visible signal, means for receiving an audible signal made remotely from the telephone and in circuit for actuation when the telephone receives a call, a second amplifier actuated responsive to the audible signal, third relay energized through the second amplifier, the relays each having plural contacts closed in predetermined sequence responsive to energization thereof, a step relay having plural contacts engaged individually beginning with a first contact and in sequence upon energization thereof under the joint control of the said first and said third relays, and a lifter for raising the telephone hand-set upon movement to a given position of the step relay to complete a circuit in the telephone receiver and transmitter.

5. In a device for answering a hand-set telephone without contact therewith by the person answering, a first coil for induction of current therein upon flow of signal current for ringing of the telephone, a first amplifier energized responsive to the current induced in the first coil, a first visible signal remote from the telephone and in circuit for actuation when the telephone receives a call, a first relay energized through the first amplifier for controlling the visible signal, means for receiving an audible signal made remotely from the telephone and in circuit for actuation when the telephone receives a call, a second amplifier actuated responsive to the audible voice signal, third relay energized through the second amplifier, a step relay having plural contacts individually engaged beginning with a first contact and in sequence upon energization thereof under the joint control of the said first and said third relays, a motor operated wedge, the motor being actuated by operation of the second amplifier upon receipt thereby of the audible signal, and lifter bars raised and lowered by the wedge for raising and lowering the telephone hand-set to complete the circuit in the telephone receiver and transmitter thereof.

6. In a device for answering a hand-set telephone without contact therewith by the person answering, a first coil for induction of current therein upon the flow of signal current for ringing of the telephone, a first amplifier energized responsive to the current induced in the first coil, a visible signal remote from the telephone and in circuit for actuation when the telephone receives a call, a first relay energized through the first amplifier for controlling the visible signal, means for receiving an audible signal made remotely from the telephone and in circuit for actuation when the telephone receives a call, a second amplifier actuated responsive to the audible signal, third relay energized through the second amplifier, a step relay having plural contacts engaged individually beginning with a first contact and in sequence upon energization thereof under the joint control of the said relays, a reversible motor operated lifter controlled by action of the step relay for raising and lowering the telephone hand-set upon operation of the motor to complete and to disconnect respectively circuits in the telephone receiver and transmitter.

7. In a device for answering a hand-set telephone without contact therewith by the person answering, a first coil for induction of current therein upon flow of signal current for ringing of the telephone, a first amplifier energized responsize to the current induced in the first coil, a visible signal remote from the telephone and in circuit for actuation when the telephone receives a call, a first relay energized through the first amplifier for controlling the visible signal, means for receiving an audible signal made remotely from the telephone and in circuit for actuation when the telephone receives a call, a second amplifier actuated responsive to the audible signal, third relay energized through the second amplifier, a step relay having plural contacts engaged individually beginning with a first contact and in sequence upon energization thereof under the joint control of the said relays, a reversible motor operated lifter controlled by action of the step relay and raising and lowering the telephone hand-set upon operation of the motor for respectively connecting and disconnecting circuits to the telephone receiver and transmitter, and a manually operable switch coacting with the step relay in controlling opertaion of the lifter motor.

8. In a device for answering a hand-set telephone without contact therewith by the person answering, a first coil for induction of current therein upon flow of signal current for ringing of the telephone, a first amplifier energized responsive to the current induced in the first coil, a visible signal remote from the telephone and in circuit for actuation when the telephone receives a call, a first relay energized through the first amplifier for controlling the visible signal, means for receiving an audible signal made remotely from the telephone and in circuit for actuation when the telephone receives a call, a second amplifier actuated responsive to the audible signal, third relay energized through the second amplifier, a step relay having plural contacts engaged individually beginning with a first contact and in sequence upon energization thereof under the joint control of the said first and said another relays, a lifter for raising the telephone hand-set upon movement to a given position of the step relay to complete a circuit in the telephone receiver and transmitter, and a timer controlled by operation of the said third relay for resetting the step relay to initial position after interruption of the sequence of starting operations.

9. In a device for answering a hand-set telephone without contact therewith by the person answering, a first coil for induction of current therein upon flow of signal current for ringing of the telephone, a first amplifier energized responsive to the current induced in the first coil, a visible signal remote from the telephone and in circuit for actuation when the telephone receives a call and a second visible signal for actuation responsive to an audible signals a first relay energized through the first amplifier for controlling the visible signal, means for receiving an audible signal made remotely from the telephone and in circuit for actuation when the telephone receives a call, a second amplifier actuated responsive to the audible signal for energizing the second visible signal, third relay energized through the second amplifier, a step relay having plural contacts individually engaged beginning with a first contact and in sequence upon energization thereof under the joint control of the said first and said third relays, a lifter for raising the telephone hand-set upon movement to a given position of the step relay to complete a circuit in the telephone receiver and transmitter, a timer controlled by operation of the said third relay for resetting the step relay to initial position if the sequence of starting operations is interrupted, and a manually operable switch for superseding operation of the timer.

10. In a device for answering a hand-set telephone without contact therewith by the person answering, a first coil for induction of current therein upon flow of signal current for ringing of the telephone, a first amplifier energized responsive to the current induced in the first coil, a visible signal remote from the telephone and in circuit for actuation when the telephone receives a call, a second visible signal for actuation responsive to the visible signal, a first relay energized through the first amplifier for controlling the visible signal, a second relay energized upon action of the first relay, an audible signal remote from the telephone and in circuit for actuation when the telephone receives a call, a second amplifier actuated responsive to a voice signal, a third relay energized through the second amplifier, a second visible signal being energized under control of the second and third relays, a step relay having plural contacts engaged individually beginning with the first contact and in sequence upon energization thereof under the joint control of the said first, second and third relays, a lifter for raising the telephone hand-set upon movement to a given position of the step relay, to complete a circuit in the telephone receiver and transmitter, a timer controlled by operation of the third relay for resetting the step relay to initial position if the sequence of starting operations is interrupted, and a manually operable switch for superseding operation of the timer.

11. In a device for answering a hand-set telephone without contact therewith by the person answering, a first coil for induction of current therein upon flow of signal current for ringing of the telephone, a first amplifier energized responsive to the current induced in the first coil, a visible signal remote from the telephone and in circuit for actuation when the telephone receives a call, a first relay energized through the first amplifier for controlling the visible signal, means for receiving an audible signal made remotely from the telephone and in circuit for actuation when the telephone receives a call, a second amplifier actuated responsive to the audible signal, third relay energized through the second amplifier, a second coil mounted on the telephone hand-set, a receiver-transmitter energized by electric currents induced in the second coil and including a loud speaker, the receiver-transmitter converting the induced currents into audible signals, a step relay having plural contacts engaged individually beginning with a first contact and in sequence upon energization thereof under the joint control of the said first and said third relays, and a lifter for raising the telephone hand-set upon movement to a given position of the step relay to complete a circuit in the telephone receiver and transmitter.

12. In a device for answering a hand-set telephone without contact therewith by the person answering, a first coil for induction of current therein upon flow of signal current for ringing of the telehpone, a first amplifier energized responsive to the current induced in the first coil, a visible signal remote from the telephone and in circuit for actuation when the telephone receives a call, a first relay energized by action of the first amplifier for controlling the visible signal, a second relay energized upon action of the first relay, an audible signal remote from the telephone and in circuit for actuation when the telephone receives a call, a second amplifier actuated responsive to the audible signal, a third relay energized through the second amplifier, means for receiving an audible signal made remotely from the telephone for actuation and after the telephone receives a call, a second coil mounted on the telephone hand-set, a receiver-transmitter energized by electric currents induced in the second coil and including a loud speaker, the receiver-transmitter converting the induced currents into audible signals, a step relay having plural contacts engaged individually beginning with a first contact and in sequence upon energization thereof under the joint control, of the first, second and third relays, and a lifter for raising the telephone hand-set upon movement to a given position of the step relay to complete a circuit in the telephone receiver and transmitter.

References Cited by the Examiner

UNITED STATES PATENTS 2,826,636 3/1958 Beatty ---------------- 179—1

ROBERT H. ROSE, *Primary Examiner.*

WILLIAM C. COOPER, *Examiner.*

ALBERT SANTORELLI, RICHARD MURRAY, *Assistant Examiners.*